Jan. 30, 1951  A. A. POTJER  2,539,971
OSCILLOGRAPHIC VOLTAGE MEASURING DEVICE
Filed Feb. 12, 1947
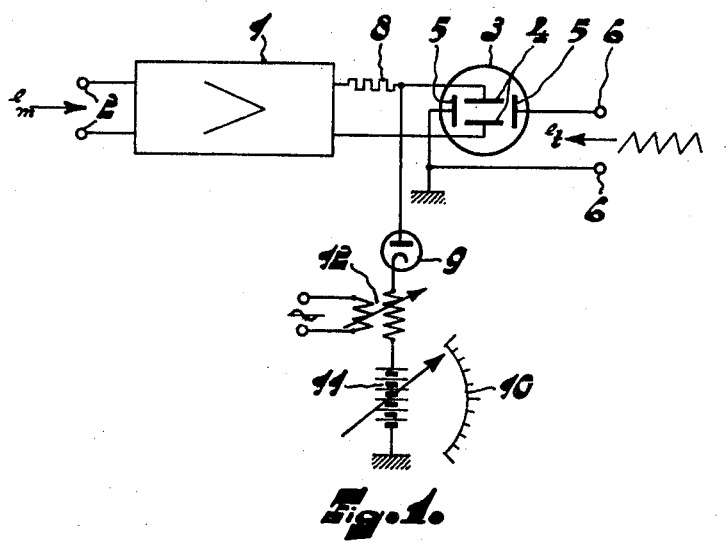
Fig. 1.
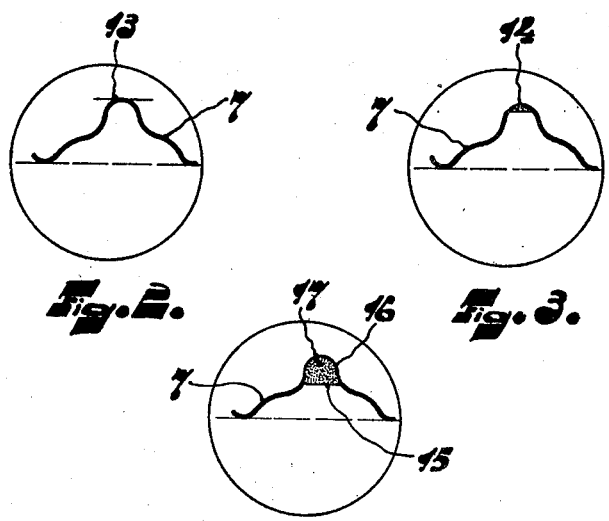
Fig. 2.  Fig. 3.
Fig. 4.
INVENTOR
A. A. POTJER
BY
AGENT Patented Jan. 30, 1951

2,539,971

UNITED STATES PATENT OFFICE 2,539,971

OSCILLOGRAPHIC VOLTAGE MEASURING DEVICE

Aildert Albert Potjer, Eindhoven, Netherlands, assignor to Hartford National Bank and Trust Company, Hartford, Conn., as trustee Application February 12, 1947, Serial No. 728,151
In the Netherlands January 5, 1944

Section 1, Public Law 690, August 8, 1946
Patent expires January 5, 1964

4 Claims. (Cl. 171—95)

This invention relates to a device for reproducing and determining the value of a measuring voltage oscillographically.

Oscillographs comprising a cathode-ray-tube are known, in which for determining the value of a measuring voltage in quick succession, by means of an electron switch, the measuring voltage and one or a series of different succeeding direct voltage values, which values are known (calibration voltages), control the cathode-ray beam in the same direction, so that the oscillogram of the measuring voltage and one or more lines representing the calibration voltages appear simultaneously on the projection screen. In this way any instantaneous value of the measuring voltage can be determined without the deflection sensitiveness of the cathode-ray-tube, which is mostly subject to comparatively strong variations, involving measuring errors.

A serious drawback of such devices consists, however, in that the time available for the reproduction of the measuring voltage is greatly limited and, moreover, the expedients required for determining the value of the measuring voltage, more particularly the switch for supplying measuring and calibration voltage in quick succession to the cathode-ray-tube, are complicated and expensive.

If the device contains already a switch in view of the simultaneous reproduction of a plurality of measuring voltages, the calibration voltage may be supplied to the cathode-ray-tube through one of the available measuring voltage canals and then the last-mentioned drawback is met, but in this case the measuring voltage canal used in supplying calibration voltages to the oscillograph is no more available for the normal purpose.

According to the invention, in a device for reproducing and determining oscillographically the value of a measuring voltage this voltage is supplied to the reproducing device through an amplitude-limiting device with a threshold value, which is adjustable by means of a calibrated scale.

When using a comparatively high threshold voltage, this voltage can now be varied during reproduction of the measuring voltage until a just visible limitation occurs in the oscillogram, when the amplitude of the measuring voltage corresponds with the value of the threshold voltage found by means of the scale. Similarly any instantaneous value of the measuring voltage can be determined. As a threshold voltage a direct voltage with superposed alternating voltage may be substituted for the direct voltage, the amplitude of the alternating voltage being small, for instance, with respect to the direct voltage. The limited parts of the oscillogram are then readily recognizable since these parts, unless a simple harmonic relation exists between the time-base frequency and the superposed alternative voltage, are reproduced with a broader line than the initial parts of the oscillogram.

In order that the invention may be clearly understood and readily carried into effect, it will now be described more fully with reference to the accompanying drawing, given by way of example, in which Figure 1 represents the circuit arrangement of a suitable form of construction of a cathode-ray oscillograph according to the invention, Figure 2 showing an oscillogram obtained by means of this device, in which no limitations occur, Figure 3 represents an oscillogram, in which limitation just occurs, and Figure 4 shows an oscillogram with a periodically active limitation.

The cathode-ray-oscillograph shown in Figure 1 comprises an amplifier 1, to the input terminals 2 of which is supplied a measuring voltage $e_m$ which, after amplification, controls the deflection of the cathode-ray beam in a diagrammatically represented cathode-ray tube 3 in a vertical direction (4). To the horizontal pair of deflecting plates is supplied a saw-tooth shaped time-base voltage $e_t$ through the terminals 6, so that an oscillogram 7 of the measuring voltage appears on the projection screen of the tube, as shown in Figure 2.

According to the invention the measuring voltage is supplied through an amplitude-limiter of a kind known per se to the vertical deflecting plates 4 of the cathode-ray tube. This limiter consists of a resistance 8 interposed in one of the conductors supplying the measuring voltage. One end of this resistance is earthed through a biased diode 9, whose bias is formed by a direct voltage (11) adjustable by means of a scale 10 and an alternating voltage (12) having a comparatively small amplitude, which may be taken from the mains.

For normal reproduction of the measuring voltage the direct voltage (11) is adjusted to such a value as to avoid with certainty a limitation of the measuring voltage and to produce the oscillogram shown in Figure 2.

For instance, if the peak-value 13 of the represented measuring voltage is to be determined, the threshold direct voltage 11 of the limiter is reduced until the peak of the oscillogram is flattened. As shown in Figure 3, as a result of the alternating voltage of the threshold voltage a broader image line appears at the peak value (vide 14 in Figure 3) simultaneously with the limitation of the measuring voltage then occurring, which makes the occurrence of limitation easier to recognize. After the threshold value of the limiter has been adjusted in the aforesaid manner the peak-value of the measuring voltage can be read off from the scale 10.

A special effect is obtained if in the case of a threshold voltage which is lower or even materially lower than the peak-value of the measuring voltage, the alternating voltages active in the threshold voltage have such an amplitude that the resulting threshold voltage periodically exceeds the threshold value of the measuring voltage. In this case the voltage limiter will alternately become active and inactive, as a result of which on the one hand a line 15 corresponding with the value of the threshold voltage 11 becomes visible on the projection screen, as shown in Figure 4, whereas on the other hand the oscillogram parts representing an instantaneous value of the measuring voltage exceeding the direct threshold voltage become visible with an image line 16 which is weakened relatively to the remainder of the oscillogram. The space 17 between these two lines is described deliberately by the cathode-ray beam and consequently becomes visible as a feeble haze. Matters are different if a harmonic relation exists between the alternating threshold voltage and the measuring voltage. For instance, in the case of the frequency of the alternating threshold voltage being a hundred times as high as the fundamental frequency of the measuring voltage and the time-base frequency chosen accordingly, the line of the threshold voltage and the oscillogram part above this line will be reproduced in dotted lines, the oscillogram part bound by two dotted lines being filled up with vertical lines. In order that the value of the active alternating threshold voltage may be controlled the coupling between the represented transformer windings 12 may, for instance, be made adjustable.

The invention may be used in the same way in cathode-ray tubes with magnetic deflection and other kinds of oscillographs, for instance, mirror oscillographs.

In principle, the limitation may also be brought about at a point of the measuring voltage cascade other than after the amplifier. For instance, one of the used amplifying tubes may bring about the desired amplitude limitation in a manner known per se. An extremely great accuracy can be obtained, however, by bringing about the limitation at the stated point in the measuring voltage cascade.

What I claim is:

1. Apparatus for measuring the amplitude of a voltage wave comprising an oscillograph provided with two deflecting members arranged to effect orthogonal deflection, an amplitude limiter, means to apply said wave across one of said deflecting members through said limiter, and means to apply a time base voltage across the other of said deflecting members whereby the pattern of said wave is exhibited by said oscillograph, said amplitude limiter including a rectifier device and a bias voltage source connected in series with said device across said one of said deflecting members, the voltage of said source being variable throughout a calibrated range whereby the threshold value of said limiter may be adjusted accordingly, the voltage of said bias source being constituted by a direct voltage having an alternating voltage component superimposed thereon.

2. Apparatus for measuring the amplitude of a voltage wave comprising an oscillograph provided with two deflecting members arranged to effect orthogonal deflection, an amplitude limiter, means to apply said wave across one of said deflecting members through said limiter, and means to apply a time base voltage across the other of said deflecting members whereby the pattern of said wave is exhibited, said amplitude limiter including a diode having an anode and a cathode, and a bias voltage source connected in series with said diode across said one of said deflecting members, said source including a direct voltage supply whose magnitude is adjustable throughout a calibrated range connected in series with an alternating voltage supply.

3. Apparatus as set forth in claim 2, wherein the amplitude of said alternating voltage supply is small relative to said direct voltage supply.

4. Apparatus as set forth in claim 3 wherein the frequency of said alternating voltage is high relative to the frequency of said time base voltage.

AILDERT ALBERT POTJER.

REFERENCES CITED

The following references are of record in the file of this patent:

UNITED STATES PATENTS

| Number | Name | Date |
|---|---|---|
| 2,012,291 | Tuttle | Aug. 27, 1935 |
| 2,173,184 | Seeley | Sept. 19, 1939 |
| 2,221,115 | Shepard | Nov. 12, 1940 |
| 2,286,894 | Browne et al. | June 16, 1942 |
| 2,293,135 | Hallmark | Aug. 18, 1942 |
| 2,438,518 | Piety | Mar. 30, 1948 |